Sept. 1, 1964

H. E. TRACY 3,147,013

DRY GAS SEAL

Filed Feb. 10, 1961

HERBERT E. TRACY
INVENTOR.

BY Joseph R. Dwyer

ATTORNEY

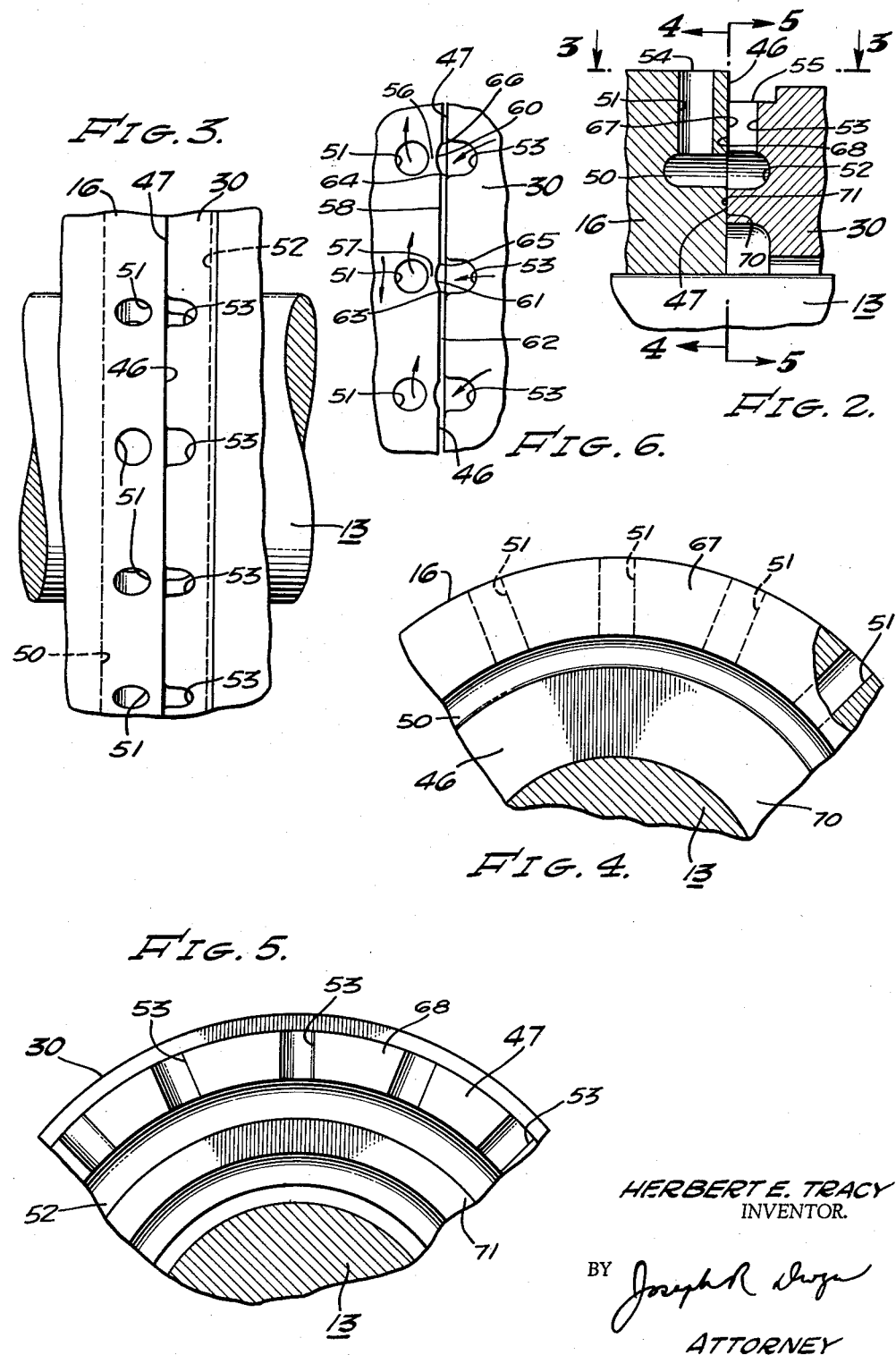

United States Patent Office 3,147,013
Patented Sept. 1, 1964

3,147,013
DRY GAS SEAL
Herbert E. Tracy, Alhambra, Calif., assignor to Borg-Warner Corporation, Chicago, Ill., a corporation of Illinois
Filed Feb. 10, 1961, Ser. No. 88,377
6 Claims. (Cl. 277—67)

This invention relates, in general, to mechanical or rotating seals to seal a rotating shaft in a pump housing or the like to prevent the escape of fluid under pressure from the housing, and relates, in particular, to a rotary seal especially adapted to operate when the fluid under pressure in the housing is gas.

Mechanical or rotary seals usually comprise means, such as a ring, which is held stationary with respect to the housing and means, such as another ring, fixed for rotation on and with the shaft. Each sealing means, sometimes called sealing elements, may comprise one or more rings, and each sealing means is provided with opposing faces arranged so that in response to either fluid pressure or spring pressure or both, there is a sealing relationship between the opposed faces to form a seal to prevent leakage along the shaft from the housing.

Heretofore it has been impractical, if not virtually impossible, to utilize the mechanical or rotary seal principal to properly seal a rotating shaft against leakage when the fluid in the pump housing or the like being pumped is gas. This is because gas, having no lubricating ability, could not prevent extreme wear and/or relatively quick seizure of the sealing faces, whereas in the pumping of liquids, such as oil, the liquid, on one principle or another, was utilized to reduce the wear and prevent seizure of the sealing faces. The lack of lubricating ability of the gases is especially true in gases which are extremley dry, such as nitrogen or helium.

One suggested solution to the problem of lubricating the sealing faces when gas is being pumped has been to inject a supply of liquid, such as oil, between the faces at a pressure which exceeded the pressure of the gas in the housing and, in this manner, wear of the sealing faces was reduced. While this may be satisfactory, it is a poor solution since it requires a source of supply of lubricating liquid, in addition to the gas being pumped, plus the added problem of possible contamination of the gas being pumped by the liquid being injected between the sealing faces.

Accordingly, it is a general object of this invention to provide a rotating or mechanical seal, particularly adapted to operate to seal gas, so constructed and arranged that good sealing ability is accomplished without the introduction of other liquids, and even when the gas being pumped is extremely dry.

Briefly, this invention comprises, in a rotary seal, means for distorting or warping at least one of the sealing faces of the sealing elements so as to trap small portions of the gas being pumped between the faces and thus provide a cushion or a gap between the two faces to reduce wear and prevent seizure of the faces. In the specific embodiment disclosed, this gap is accomplished by the provision of a centrifugal pump being incorporated in or forming a part of one of the elements or at least operatively disposed between the elements which causes a circulation of gas through the elements and adjacent the faces causing at least one of the faces to have different amounts of expansion axially at portions spaced peripherally to thus incorporate pockets in which gas may be trapped.

Accordingly, a more specific object of this invention is the provision of a means for distorting at least one face of a pair of faces of a rotary seal by different amounts of expansion on parts thereof to reduce wear and prevent seizure thereof.

Still another specific object of this invention is the provision of a means for cooling one of the faces of a rotating seal in portions spaced throughout by the circulation of the gas in the housing where the seal is located through one of the rotating means.

Yet another specific object of this invention is the provision of a centrifugal pump operatively located between the stationary and rotating sealing elements of a rotary seal to reduce wear and prevent seizure thereof.

Other and additional objects of this invention will be apparent to those skilled in the art after a study of the drawings forming part hereof and wherein:

FIG. 2 is an enlarged partial fragmentary view of the rotating sealing means disclosed in FIG. 1;

FIG. 3 is an enlarged fragmentary peripheral view taken along line 3—3 of FIG. 2 and looking in the direction of the arrows;

FIG. 4 is a partial fragmentary end view of one of the sealing means, partially broken away and taken along line 4—4 of FIG. 2;

FIG. 5 is an enlarged fragmentary end view of one of the sealing means taken along line 5—5 of FIG. 5 and looking in the direction of the arrows; and FIG. 6 is an enlarged but exaggerated schematic illustration of the peripheral view such as shown in FIG. 3 illustrating the faces as they probably appear when the seal is operating.

Figure 1:
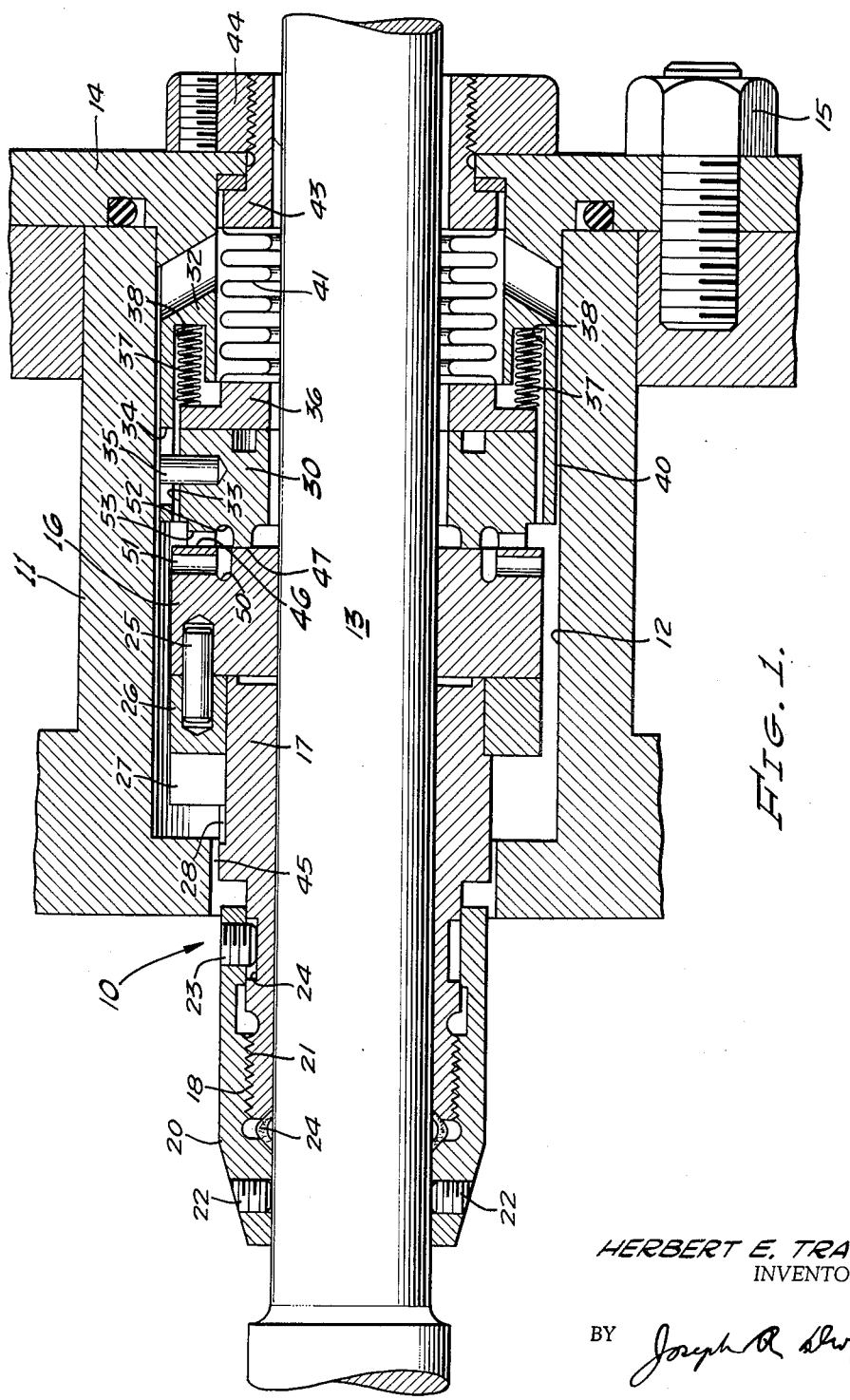
FIG. 1 is a cross sectional view of a mechanical or rotary seal constructed in accordance with the teachings of this invention.

Turning now to FIG. 1 of the drawings, it can be seen that there is illustrated therein, a mechanical or rotary seal, indicated in its entirety as 10, and comprising a housing 11, forming part of another housing (not shown) in which gas is being pumped under pressure, having an inner bore 12 in which is disposed a rotatable shaft 13 in spaced relationship therewith. The housing 11 has a flange 14 suitably attached thereto as by bolt means 15.

A rotatable sealing means 16 is suitably attached to the shaft 13 for rotation therewith. The attaching means in this specific embodiment comprises a sleeve 17 having external threads 18 over which a cup-like member 20 internally threaded as at 21 is telescoped and attached by being threaded onto external threads 18. Cup-like member 20 is affixed to the shaft by threaded pins 22 and is connected to the rotating sleeve by a threaded pin 23 which fits into an annular seat 24. Cup-like member 20 provides a means of adjustably fitting the sleeve 17 to the shaft to accommodate variations in the size of the sleeve 17 and the shaft in accordance with good engineering practice. Sealing means, such as seal 24, prevents leakage from the gas out along the shaft as is apparent. Rotating sealing means 16 is attached to the sleeve by means of pins 25 (one shown) which fit into a ring 26 having projections 27 (one shown) which, in turn, fit into axial slots 28 in the sleeve 17. Thus, rotation of the shaft causes rotation of the sealing means 16.

A nonrotatable stationary sealing means 30 is held in the housing 11 against rotation. The means for holding the stationary sealing means nonrotatable in this embodiment, comprises a sleeve 32 which telescopes over the outer periphery 33 of the sealing means 30 and is provided with a plurality of elongated slots 34 (one shown). Radially extending pins (one shown) 35 fit tightly into the nonrotating sealing means 30 and extend into the slot 34. Slots 34 and pins 35 permit axial movement of the sealing means 30 along the shaft for proper axial adjustment. Since sleeve 32 is affixed against rotation, which, in this case, is by means of being formed as part of the flange 14, the pins and slots also affix the stationary sealing means 30 against rotation. A suitable backup ring 36 is provided against which a plurality of helical compression springs 37 react to urge the sealing means 30 towards the rotating sealing means 16. Springs 37 seat in bores 38 in the sleeve 32 so as to react thereagainst. Means to prevent leakage of gas from around the periphery of the seal, as at 40 out along the shaft is provided and in which this embodiment comprises a bellows 41 sealed against leakage onto the backup ring 36 and onto a flange sleeve 43, the latter being rotatably secured to the flange 14 in any suitable manner as by nut means 44.

It is to be understood that the means for attaching the rotating sealing means to the shaft and the means for attaching the nonrotating sealing means to the housing may vary, such means as disclosed herein being one practical embodiment of such means as illustrative of attaching means in its broadest sense.

From the above description, it can be seen that gas under pressure from the remainder of the housing, viz., a pump housing or the like, is permitted to flow through the bore 45 and into bore 12, but is prevented from leaking out along the shaft by the sealing means 16 and 30. Sealing means 30 has a radial face 46 and sealing means 30 has a radial face 47 which opposes face 46 to form sealing faces to be described in more detail.

As previously mentioned, the use of rotary seals has heretofore been virtually impossible because of the lack of lubricating ability of the gas being sealed. The rotating and nonrotating sealing means being usually of different material, such as a hard metal like Stellite, on the one hand and carbon or soft metal like bronze on the other, will wear quite rapidly when in contacting relationship, even when the sealing faces are lapped optically flat.

As a matter of fact, when prior art rotary seals have been used for gases, the maximum life was very short. Yet on the other hand, it has been found that rotary seals, constructed in accordance with the teachings of this invention, have lasted appreciably longer.

Turning now to FIGS. 2-6, it can be seen that there is illustrated the rotating and stationary sealing elements 16 and 30, respectively, enlarged to more clearly illustrate the specific details thereof. It can be noted that the rotating sealing element 16 is provided with an annular groove 50 which opens into the sealing face 46 and which is located approximately centrally of the sealing face. A plurality of radially disposed passages or bores 51 spaced about the periphery of the rotating sealing means open into the groove 50 and serve to communicate the bore 12 with the groove 50.

The nonrotating or stationary sealing means is provided with an annular groove 52, which opens into the sealing face 47 and which is so disposed to communicate with the groove 50 of the rotatable sealing means. Means in the form of slots or radially disposed grooves 53 are formed in the face 47 and communicate at one end with the annular groove 52 and at the other end with the bore 12. The number of grooves 53, in the specific embodiment disclosed, correspond to the number of passages 51, although this is not a necessary requirement.

With this arrangement, rotation of the rotatable sealing means 16 acts as a centrifugal pump discharging gas from the annular groove 50 radially outwardly of the periphery so that the peripheral extremity of the passages 51 serve as pump outlets 54. On the other hand, the groove 52, being in communication with the chamber 50, to supply fluid to chamber 50 and/or to function as one chamber, with the peripheral extremity 55 of the grooves 53 serving as pump inlets for the supply to the centrifugal pump.

Thus, it can be seen from the foregoing that gas in the mechanical seal assembly is pumped centrifugally from the pump inlets 55 out the pump outlets 54 causing a circulation of the gas through the sealing elements for cooling.

Turning now specifically to FIG. 6, it is to be noted that the sealing elements are shown in their operating condition but exaggerated for the purpose of clarity and understandability. With the rotating sealing element operating as a pump, as previously described, gas in the assembly enters the inlets 55 and is expelled from the outlets 54. With this circulation of gas, the material adjacent the passages 51, as for example at 56 and 57, will have a different amount of expansion than the area between the passages, as for example at 58, i.e., areas 56 and 57 will expand less due to the cooling effect of the circulation of gas than will the areas 58 due to friction. With this phenomena, the face 46 is warped and distorted to form radial pockets such as 60 and 61, which extend from the periphery of the sealing element to the groove 50. Otherwise stated, portions of the seal face 46 are spaced from the seal face 47 in response to the circulation of fluid in the seal assembly more than other portions of the face 46 are so spaced so as to form pockets 60, 61 in which small amounts of gas are trapped. By the rotation of the sealing elements, these small amounts of trapped gases are forced between the faces 46 and 47 as the pockets 60 and 61 rotate with respect to the seal face 47, causing the seal face 46 in its entirety to be spaced or provide a gap such as illustrated at 62 between the two seal faces. Thus, the two seal faces ride, as it were, on a cushion of gas. More specifically, it can be appreciated that the small amounts of trapped fluid will be forced over the leading edge, such as 63 and 64 by the trailing edges 65 and 66 by the continued turning of the rotating face. With the cushion of gas being so provided between the faces 46 and 47, not only are the radially outer parts 67 and 68, sometimes called the bearing portions or parts, of faces 46 and 47, respectively, i.e., radially outwardly of grooves 50 and 52 spaced from each other but also the radially inner parts 70 and 71, sometimes called the sealing portions or parts, of faces 46 and 47, respectively, are spaced from each other so that wear and resultant seizure of the outer sealing faces is considerably diminished.

And also, while passages 53 are shown to be opening onto the face 46, the face 46 could be continuous with one or more grooves 53, communicating with the annular groove 52, it being sufficient that the groove 50 of the rotating member be provided with a supply of gas so that the same may operate as a centrifugal impeller. For example, the stationary sealing means could be formed substantially identical to the rotating sealing means, that is, it would have bores 51 in lieu of grooves 53 and thus from its own pockets such as 60 and 61 and would function in the manner as described in the illustrated embodiment. It is also possible that the passages 53 be bored diagonally into the groove 52, as for example, from adjacent the pin 35. All that is really important is that the rotating sealing means, which acts as a pump, be provided with a source of supply gas to function in the manner described.

While the above has been directed to a description of this invention operating in a gas media, is can be appreciated that this same seal could be utilized for the pumping of liquids with the liquids functioning to cool portions of the sealing means in a manner described; it being obvious, however, that the principal value of this seal is in the pumping of gas with a problem of wear and resultant seizure is particularly important.

While the various parts herein have been described as upper and lower or in a right or left position, such description refers only to the relative position of the parts as shown in the drawings and is not intended to be a limitation of the invention; it being understood that the appended claims should be construed as broadly as the prior art will permit.

What is claimed:
1. In a seal assembly for handling fluids under pressure the combination comprising a housing having a rotatable shaft extending therethrough; sealing means in said hous- ing and surrounding said shaft, one of said sealing means being arranged to rotate with the shaft and the other of said sealing means being mounted for slidable non-rotatable movement relative thereto; means urging said sealing means into face-to-face relation, fluid inlet means in said other sealing means arranged to receive pressure fluid within the housing, and fluid outlet means in the one said sealing means and in close proximity to the sealing face of said one sealing means, and intercommunicating means in the surfaces of said sealing means providing for fluid communication therebetween whereby the fluid emitted from the fluid outlet means in said one sealing means serves as an impeller while a portion of the fluid is trapped between the surfaces of the sealing means and forms a cushion to reduce wear thereof.

2. In a seal assembly for handling fluids under pressure the combination comprising a housing having a rotatable shaft extending therethrough; sealing means in said housing and surrounding said shaft, one of said sealing means being arranged to rotate with the shaft and the other of said sealing means being mounted for slidable non-rotatable movement relative thereto; means urging the other of said sealing means into face-to-face relation with said rotatable sealing means, fluid inlet means in said other sealing means arranged to receive pressure fluid within the housing, and fluid outlet means in the one said sealing means and in close proximity to the sealing face of said one sealing means, and intercommunicating means in the surfaces of said sealing means providing for fluid communication therebetween whereby the fluid emitted from the fluid outlet means in said one sealing means serves as an impeller while a portion of the fluid is trapped between the surfaces of the sealing means and forms a cushion to reduce wear thereof.

3. In a seal assembly for handling fluids under pressure as claimed in claim 2, wherein said fluid inlet means in said other sealing means is formed in a radial planar surface and comprises a plurality of radially arranged grooves which extend from the perimeter thereof to and intersect an annular recess.

4. In a seal assembly for handling fluids under pressure as claimed in claim 3, wherein the fluid outlet means in the one said sealing means comprises an annular recess communicating with the annular recess of said other sealing means.

5. In a seal assembly for handling fluids under pressure as claimed in claim 2, wherein the means urging the other of said sealing means into face-to-face relation with said rotatable sealing means is interposed between a back-up ring and a non-rotatable sleeve.

6. In a seal assembly for handling fluids under pressure as claimed in claim 5, wherein a telescoping secondary sealing means comprising a bellows is interposed between said back-up ring and a flange sleeve.

References Cited in the file of this patent

UNITED STATES PATENTS

| | | |
|---|---|---|
| 2,928,685 | Tracy | Mar. 15, 1960 |
| 2,990,202 | Dennison | June 27, 1961 |
| 2,992,842 | Shevchenko et al. | July 18, 1961 |
| 3,042,415 | Smoll | July 3, 1962 |
| 3,090,654 | Wald et al. | May 21, 1963 |

FOREIGN PATENTS

| | | |
|---|---|---|
| 16,643 | Australia | Nov. 7, 1929 |